United States Patent
Cheng et al.

(10) Patent No.: US 9,639,163 B2
(45) Date of Patent: *May 2, 2017

(54) CONTENT TRANSFER INVOLVING A GESTURE

(71) Applicant: Microsoft Technology Licensing, LLC, Redmond, WA (US)

(72) Inventors: Long Cheng, Beijing (CN); Yi Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

This patent is subject to a terminal disclaimer.

(21) Appl. No.: 14/168,137

(22) Filed: Jan. 30, 2014

(65) Prior Publication Data
US 2014/0149881 A1 May 29, 2014

(51) Int. Cl.
*H04M 3/42* (2006.01)
*G06F 3/01* (2006.01)
*H04W 4/02* (2009.01)
*H04W 4/20* (2009.01)
*H04M 1/725* (2006.01)
*G06F 3/0484* (2013.01)
*G06F 3/0488* (2013.01)

(52) U.S. Cl.
CPC ............ *G06F 3/017* (2013.01); *G06F 3/0488* (2013.01); *G06F 3/04842* (2013.01); *H04M 1/7253* (2013.01); *H04W 4/02* (2013.01); *H04W 4/023* (2013.01); *H04W 4/206* (2013.01); *H04M 2250/22* (2013.01); *H04M 2250/64* (2013.01)

(58) Field of Classification Search
CPC ............ H04M 1/6058; H04M 1/7253; H04M 1/72544; H04M 1/72572; H04M 2250/12; H04M 2250/22
USPC ......... 455/456.1, 426.1, 41.1, 411, 41.2, 457
See application file for complete search history.

(56) References Cited

U.S. PATENT DOCUMENTS

| | | | |
|---|---|---|---|
| 6,215,865 | B1 | 4/2001 | McCalmont |
| 6,654,722 | B1 | 11/2003 | Aldous et al. |
| 6,904,025 | B1 | 6/2005 | Madour et al. |

(Continued)

FOREIGN PATENT DOCUMENTS

| | | |
|---|---|---|
| EP | 1526457 | 4/2005 |
| EP | 1592198 | 11/2005 |

(Continued)

OTHER PUBLICATIONS

"Final Office Action", U.S. Appl. No. 12/290,232, Jul. 16, 2014, 22 pages.

(Continued)

*Primary Examiner* — Joseph Arevalo
(74) *Attorney, Agent, or Firm* — Klarquist Sparkman, LLP

(57) ABSTRACT

Content transfer involving a gesture is described. In an implementation, a method is implemented by a mobile communications device that includes recognizing a gesture input via a touchscreen of the mobile communications device that is indicative of a direction, the touchscreen including a display of content. One or more other mobile communications devices are located that are positioned, approximately, along the indicated direction of the gesture. A communication is formed to transfer the content to the located one or more other mobile communications devices.

19 Claims, 6 Drawing Sheets

(56) References Cited

U.S. PATENT DOCUMENTS

| | | |
|---|---|---|
| 7,260,186 B2 | 8/2007 | Zhu et al. |
| 7,301,919 B2 | 11/2007 | Sundquist et al. |
| 7,526,253 B2 | 4/2009 | Fujioka |
| 7,532,196 B2 | 5/2009 | Hinckley |
| 7,693,133 B2 | 4/2010 | Benco et al. |
| 8,055,296 B1* | 11/2011 | Persson ............... G02B 27/017 455/456.1 |
| 8,380,225 B2 | 2/2013 | Cheng et al. |
| 8,447,070 B1 | 5/2013 | Bozarth et al. |
| 8,676,175 B2 | 3/2014 | Cheng et al. |
| 2002/0034166 A1 | 3/2002 | Barany et al. |
| 2003/0058805 A1 | 3/2003 | Meyerson et al. |
| 2003/0177099 A1 | 9/2003 | Gallant et al. |
| 2005/0021872 A1 | 1/2005 | Poustchi et al. |
| 2005/0231471 A1 | 10/2005 | Mallard et al. |
| 2005/0278778 A1 | 12/2005 | D'Agostino et al. |
| 2006/0045070 A1 | 3/2006 | Fotta et al. |
| 2006/0164238 A1 | 7/2006 | Karaoguz et al. |
| 2006/0256074 A1 | 11/2006 | Krum et al. |
| 2006/0291474 A1 | 12/2006 | Ollis et al. |
| 2007/0025293 A1 | 2/2007 | Choi |
| 2007/0146347 A1 | 6/2007 | Rosenberg |
| 2007/0197229 A1 | 8/2007 | Kalliola et al. |
| 2008/0031210 A1 | 2/2008 | Abhishek et al. |
| 2008/0039212 A1 | 2/2008 | Ahlgren et al. |
| 2008/0075240 A1 | 3/2008 | Ramanathan et al. |
| 2008/0081656 A1 | 4/2008 | Hiles |
| 2008/0096583 A1 | 4/2008 | Karaoguz et al. |
| 2008/0129686 A1* | 6/2008 | Han ................... G06F 3/0482 345/156 |
| 2008/0152263 A1 | 6/2008 | Harrison |
| 2008/0174547 A1 | 7/2008 | Kanevsky |
| 2008/0252491 A1 | 10/2008 | DeRuyter |
| 2008/0263460 A1* | 10/2008 | Altberg ................ G06Q 30/02 715/757 |
| 2009/0075678 A1 | 3/2009 | Ogoro |
| 2009/0136016 A1 | 5/2009 | Gornoi et al. |
| 2009/0244015 A1 | 10/2009 | Sengupta et al. |
| 2009/0265470 A1 | 10/2009 | Shen et al. |
| 2010/0013780 A1 | 1/2010 | Ikeda et al. |
| 2010/0069004 A1 | 3/2010 | Bloebaum |
| 2010/0075605 A1 | 3/2010 | Yoneda et al. |
| 2010/0156812 A1* | 6/2010 | Stallings ............. G06F 3/04883 345/173 |
| 2010/0159981 A1 | 6/2010 | Chiang et al. |
| 2010/0178873 A1 | 7/2010 | Lee et al. |
| 2010/0261496 A1 | 10/2010 | Fukumoto et al. |
| 2010/0272250 A1 | 10/2010 | Yap et al. |
| 2010/0315438 A1 | 12/2010 | Horodezky et al. |
| 2011/0045839 A1 | 2/2011 | Chao |
| 2011/0065384 A1 | 3/2011 | Cader et al. |
| 2011/0065459 A1 | 3/2011 | Cheng et al. |
| 2011/0081923 A1 | 4/2011 | Forutanpour et al. |
| 2011/0110371 A1 | 5/2011 | Fry |
| 2011/0163944 A1 | 7/2011 | Bilbrey et al. |
| 2011/0175822 A1 | 7/2011 | Poon et al. |
| 2011/0197147 A1 | 8/2011 | Fai |
| 2011/0219419 A1 | 9/2011 | Reisman |
| 2011/0243141 A1 | 10/2011 | Blackburn et al. |
| 2011/0246538 A1 | 10/2011 | Boley et al. |
| 2011/0252381 A1 | 10/2011 | Chaudhri |
| 2012/0005632 A1 | 1/2012 | Broyles, III et al. |
| 2012/0144073 A1 | 6/2012 | Smith et al. |
| 2012/0182988 A1 | 7/2012 | Brenes et al. |
| 2013/0111039 A1 | 5/2013 | Gomes |
| 2013/0157630 A1 | 6/2013 | Cheng |
| 2013/0169736 A1 | 7/2013 | Lindblom |
| 2013/0219278 A1 | 8/2013 | Rosenberg |
| 2013/0219288 A1 | 8/2013 | Rosenberg |

FOREIGN PATENT DOCUMENTS

| | | |
|---|---|---|
| GB | 2479180 | 10/2011 |
| WO | WO-2005009019 | 1/2005 |
| WO | WO-2007126652 | 11/2007 |
| WO | WO-2009033217 | 3/2009 |

OTHER PUBLICATIONS

"Non-Final Office Action", U.S. Appl. No. 13/400,418, Sep. 29, 2014, 22 pages.

"Non-Final Office Action", U.S. Appl. No. 13/400,403, Sep. 11, 2014, 27 pages.

"Advisory Action", U.S. Appl. No. 12/290,232, Jan. 29, 2013, 3 Pages.

"Extended European Search Report", EP Application No. 12199326.5, Apr. 3, 2013, 6 pages.

"Final Office Action", U.S. Appl. No. 12/290,232, Dec. 6, 2012, 18 pages.

"Final Office Action", U.S. Appl. No. 13/400,403, Dec. 19, 2013, 24 pages.

"Final Office Action", U.S. Appl. No. 13/400,418, Dec. 30, 2013, 20 pages.

"International Search Report and Written Opinion", Application No. PCT/US2013/026916, Jun. 18, 2013, 10 pages.

"International Search Report and Written Opinion", Application No. PCT/US2013/026961, Jun. 2, 2013, 10 pages.

"International Search Report and Written Opinion", Application No. PCT/US2012/072025, Mar. 26, 2013, 12 pages.

"Non-Final Office Action", U.S. Appl. No. 12/290,232, Jan. 16, 2014, 21 pages.

"Non-Final Office Action", U.S. Appl. No. 12/290,232, Jun. 11, 2012, 16 pages.

"Non-Final Office Action", U.S. Appl. No. 12/558,782, Nov. 28, 2011, 22 pages.

"Non-Final Office Action", U.S. Appl. No. 12/558,782, May 17, 2012, 11 pages.

"Non-Final Office Action", U.S. Appl. No. 13/400,403, Jul. 8, 2013, 20 pages.

"Non-Final Office Action", U.S. Appl. No. 13/400,418, Jul. 8, 2013, 19 pages.

"Non-Final Office Action", U.S. Appl. No. 13/765,599, Apr. 12, 2013, 12 pages.

"Notice of Allowance", U.S. Appl. No. 12/558,782, Oct. 15, 2012, 9 pages.

"Notice of Allowance", U.S. Appl. No. 13/765,599, Oct. 21, 2013, 10 pages.

"Voice over IP (VOIP) Phone System Provider, Philadelphia Pa", Retrieved from <http://www.expertta.com/philadelphia-pa-voice-over-ip-system-provider> on Dec. 11, 2012, Jan. 17, 2010, 2 pages.

Dachselt, et al., "Throw and Tilt—Seamless Interaction across Devices using Mobile Phone Gestures", Retrieved from <http://isgwww.cs.uni-magdeburg.de/uise/Forschung/Publikationen/2009-MEIS-Throw-and-Tilt.pdf>, 2008, 7 pages.

Lazarov, et al., "Data Handling Displays", Retrieved from <http://www.ics.uci.edu/~bsajadi/ProCams2009.pdf>, 2009, 8 pages.

Mock, et al., "A Voice over IP Solution for Mobile Radio Interoperability", IEEE 56th Vehicular Technology Conference, Retrieved from <http://ieeexplore.ieee.org/stamp/stamp.jsp?tp=&arnumber=1040433>,Sep. 24, 2002, 4 pages.

Omata, et al., "A Gesture-Based Interface for Seamless Communication between Real and Virtual Worlds", Retrieved from <http://www.ui4all.gr/U14ALL-2000/files/Long_papers/Omata.pdf>, Oct. 25, 2000, 13 pages.

Oprea, et al., "Securing a Remote Terminal Application with a Mobile Trusted Device", 20th Annual Conference on Computer Security Applications, Retrieved from <http://www.rsa.com/rsalabs/staff/bios/aoprea/publications/acsac.pdf>,Dec. 6, 2004, 10 pages.

"The Session Initiation Protocol (SIP) Refer Method", Retrieved from <https://datatracker.ietf.org/doc/rfc3515/> on Jan. 11, 2014, Apr. 2003, 20 pages.

(56) References Cited

OTHER PUBLICATIONS

"Final Office Action", U.S. Appl. No. 13/400,418, Feb. 17, 2015, 22 pages.
"Final Office Action", U.S. Appl. No. 13/400,403, Mar. 25, 2015, 23 pages.
"Non-Final Office Action", U.S. Appl. No. 13/400,418, Jul. 6, 2015, 24 pages.
"Extended European Search Report", EP Application No. 13751888.2, Jul. 14, 2015, 6 pages.
"Extended European Search Report", EP Application No. 13752395.7, Jul. 16, 2015, 7 pages.

* cited by examiner

CONTENT TRANSFER INVOLVING A GESTURE

RELATED APPLICATIONS

The application claims priority under 35 U.S.C. Section 120 as a continuation of U.S. patent application Ser. No. 13/765,599, filed Feb. 12, 2013, and titled "Content Transfer Involving a Gesture", which is a continuation of Ser. No. 12/558,782, filed Sep. 14, 2009, and titled "Content Transfer Involving a Gesture," the entire disclosures of which are incorporated by reference.

BACKGROUND

Mobile communication devices (e.g., wireless phones) have become an integral part of everyday life. However, the form factor employed by conventional mobile communications devices is typically limited to promote mobility of the device.

For example, the mobile communications device may have a relatively limited amount of display area when compared to a conventional desktop computer, e.g., a PC. Therefore, conventional techniques used to interact with a desktop computer may be inefficient when employed by a mobile communications device. For example, traditional techniques that were used to transfer content typically forced a user to navigate through a series of menus to select content to transfer, select a device to receive the content, and then initiate the transfer. Accordingly, these steps may result in user frustration, especially when transferring multiple items of items of content to different users.

SUMMARY

Content transfer involving a gesture is described. In an implementation, a method is implemented by a mobile communications device that includes recognizing a gesture input via a touchscreen of the mobile communications device that is indicative of a direction, the touchscreen including a display of content. One or more other mobile communications devices are located that are positioned, approximately, along the indicated direction of the gesture. A communication is formed to transfer the content to the located one or more other mobile communications devices.

In an implementation, one or more computer-readable storage media include instructions that are executable by a mobile communications device to determine whether one or more other mobile communications devices are within a predetermined range. If so, data is stored that describes a relative position of the one or more other mobile communications devices in relation to the mobile communications device. The relative position is to be used in determining which of the one or more mobile communications devices are to share content from the mobile communications device in response to a gesture received via the mobile communications device.

In an implementation, a mobile communications device includes a touchscreen having a plurality of edges, a processor, and memory configured to maintain content and an operating system. The operating system is executable on the processor to determine that a gesture received via the touchscreen is indicative of a particular one of four edges of the touchscreen, the gesture being received during display of the content on the touchscreen. The operating system is also executable to determine that one or more other mobile communications devices are positioned, approximately, along the particular edge of the touchscreen. The operating system is further executable to form a communication to wirelessly transfer the content to the located one or more other mobile communications devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Mobile communications devices typically have a small form factor to aide mobility of the mobile communications device. For example, the mobile communications device (e.g., a mobile phone) may be configured with a relatively minimal amount of display area and limited input devices (e.g., a keypad) so that the device may be easily transported. Consequently, traditional techniques used to interact with a conventional computer (e.g., a desktop PC) may be frustrating when used in conjunction with a mobile communications device.

For instance, conventional techniques that were used to transfer content may involve multiple steps that are accessed through a series of menus. Consequently, these conventional techniques may be frustrating to users when incorporated by a mobile communications device, especially when transfer of multiple items of content is desired.

In an implementation, content transfer involving a gesture is described. The gesture received by a mobile communications device is indicative of a direction. Additionally, this gesture may be received during output of content, such as during display of an image on the touchscreen such that the gesture also indicates what content is to be transferred.

For example, a "flick" or "drag" may be input via a touchscreen of the mobile communications device during a display of content (e.g., an image) that is directed towards an edge of the touchscreen. The mobile communications device may then determine if one or more other mobile communications devices are located along that edge of the touchscreen, e.g., in the approximate direction of the gesture. If so, content that was concurrently output during the gesture may be transferred to the one or more other mobile communications devices. In this way, a single gesture may be used to select content for transfer and indicate where the content is to be transferred without navigating through multiple menus. A variety of other examples are also contemplated, further discussion of which may be found in relation to the following sections.

In the following discussion, a variety of example implementations of a mobile communications device (e.g., a wireless phone) are described. Additionally, a variety of different functionality that may be employed by the mobile communications device is described for each example, which may be implemented in that example as well as in other described examples. Accordingly, example implementations are illustrated of a few of a variety of contemplated implementations. Further, although a mobile communications device having one or more modules that are configured to provide telephonic functionality are described, a variety of other computing devices are also contemplated, such as personal digital assistants, mobile music players, dedicated messaging devices, portable game devices, netbooks, and so on.

Example Implementations

Figure 1:
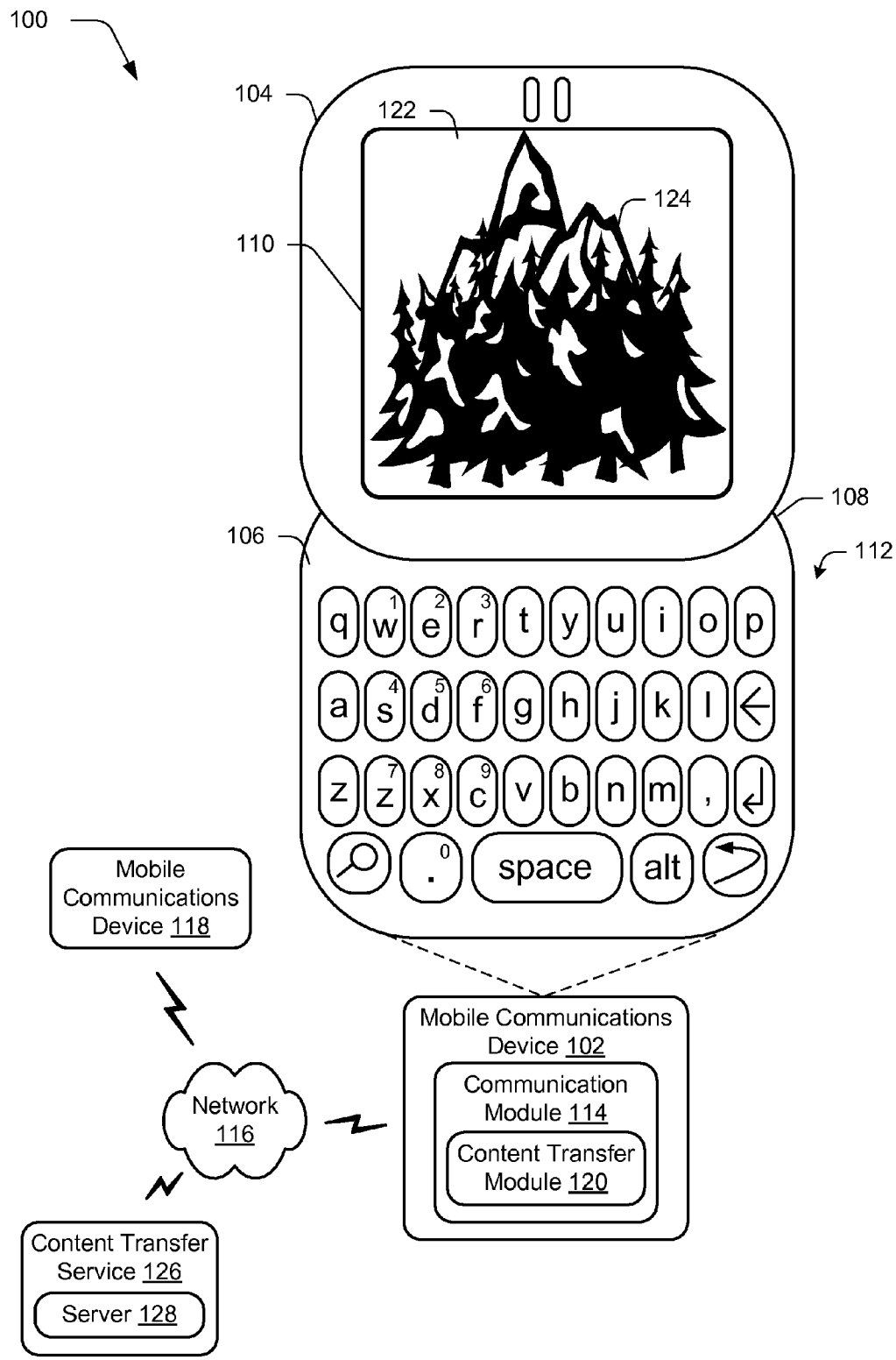
FIG. 1 is an illustration of an example implementation of a mobile communications device in accordance with one or more embodiments of devices, features, and systems for mobile communications.
Figure 2:
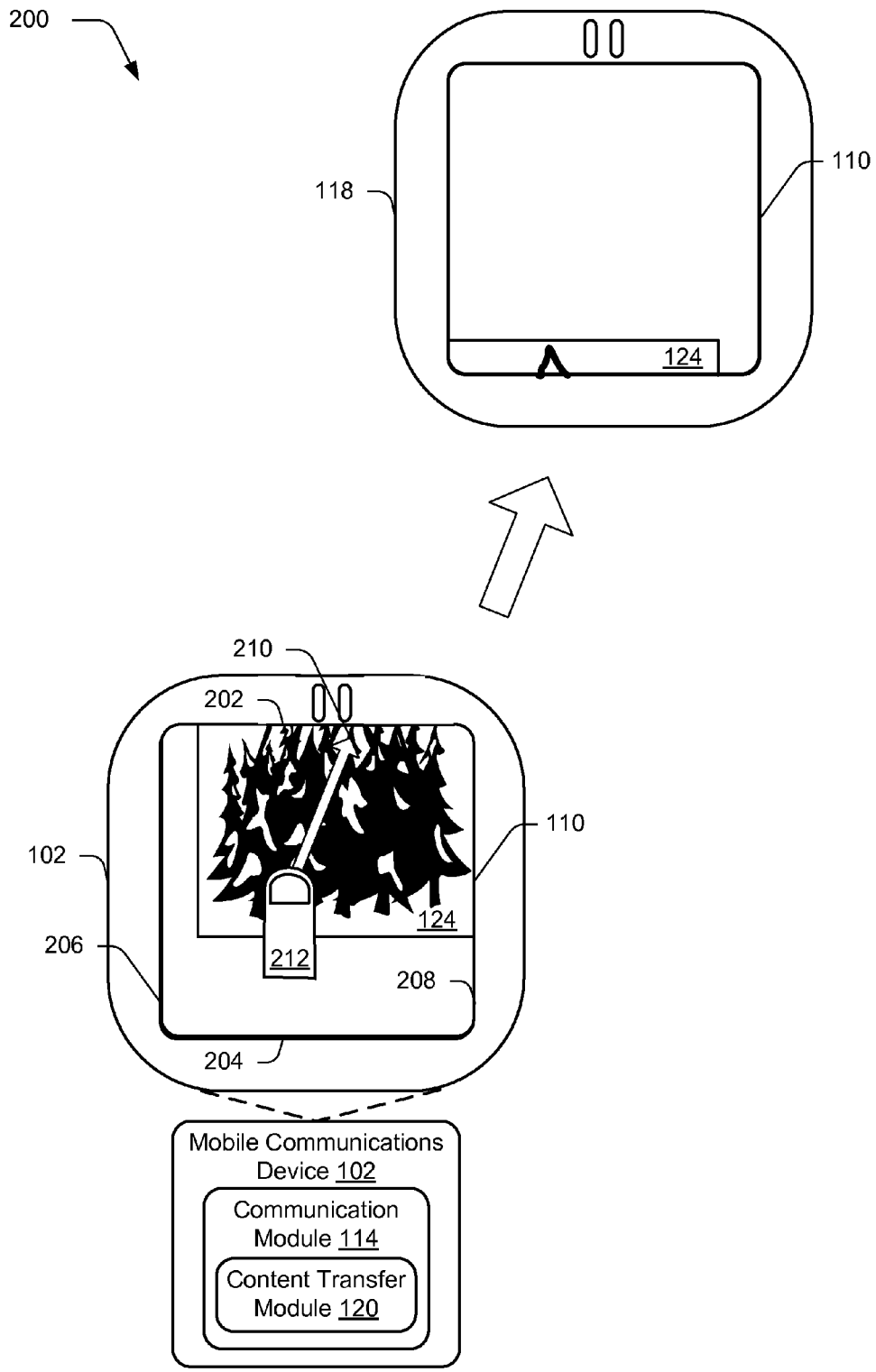
FIG. 2 depicts a system in an example implementation showing a gesture used to initiate a transfer of content from a mobile communications device to another mobile communications device.

FIG. 1 is an illustration of an example implementation 100 of a mobile communications device 102 in accordance with one or more embodiments of devices, features, and systems for mobile communications. The mobile communications device 102 is operable to assume a plurality of configurations, examples of which include a configuration as illustrated in FIG. 1 in which the mobile communications device 102 is "open" and a configuration in which the mobile communications device 102 is "closed" as illustrated in FIG. 2.

The mobile communications device 102 is further illustrated as including a first housing 104 and a second housing 106 that are connected via a slide 108 such that the first and second housings 104, 106 may move (e.g., slide) in relation to one another. Although sliding is described, it should be readily apparent that a variety of other movement techniques are also contemplated, e.g., a pivot, a hinge and so on.

The first housing 104 includes a display device 110 that may be used to output a variety of content, such as a caller identification (ID), contacts, images (e.g., photos) as illustrated, email, multimedia messages, Internet browsing, game play, music, video, and so on. In an implementation, the display device 110 is configured to function as an input device by incorporating touchscreen functionality, e.g., through capacitive, surface acoustic wave, resistive, optical, strain gauge, dispersive signals, acoustic pulse, and other touchscreen functionality. The touchscreen functionality (as well as other functionality such as track pads) may be used to detect gestures, further discussion of which may be found in relation to the later figures.

The second housing 106 is illustrated as including a keyboard 112 that may also be used to provide inputs to the mobile communications device 102. Although the keyboard 112 is illustrated as a QWERTY keyboard, a variety of other examples are also contemplated, such as a keyboard that follows a traditional telephone keypad layout (e.g., a twelve key numeric pad found on basic telephones), keyboards configured for other languages (e.g., Cyrillic), and so on.

In the "open" configuration as illustrated in the example implementation 100 of FIG. 1, the first housing 104 is moved (e.g., slid) "away" from the second housing 106 using the slide 108. Other implementations are also contemplated, such as a "clamshell" configuration, "brick" configuration, and so on.

The form factor employed by the mobile communications device 102 may be suitable to support a wide variety of features. For example, the keyboard 112 is illustrated as supporting a QWERTY configuration. This form factor may be convenient to a user to utilize the previously described functionality of the mobile communications device 102, such as to compose texts, play games, check email, "surf" the Internet, provide status messages for a social network, and so on.

The mobile communications device 102 is also illustrated as including a communication module 114. The communication module 114 is representative of functionality of the mobile communications device 102 to communicate via a network 116, such as with another mobile communications device 118. For example, the communication module 114 may include telephone functionality to make and receive telephone calls from the mobile communications device 118. The communication module 114 may also include a variety of other functionality, such as to capture content, form short message service (SMS) text messages, multimedia messaging service (MMS) messages, emails, status updates to be communicated to a social network service, and so on. A variety of other examples are also contemplated, such as blogging, instant messaging, and so on.

The mobile communications device 102 is also illustrated as including a content transfer module 120. The content transfer module 120 is representative of functionality of the mobile communications device 102 to manage a user interface 122 to transfer content 124 to the other mobile communications device 118 via the network 116.

The content transfer module 120 may cause the content to be transferred in a variety of different ways over a variety of networks 116. For example, the content transfer module 120 may communicate directly with the mobile communications device 118 over the network 116, e.g., when configured as a WiFi network or other local wireless network such as Bluetooth. The content transfer module 120 may also communicate the content 124 indirectly over the network 116 when configured as the Internet, such as through a content transfer service 126 implemented using one or more servers 128, further discussion of which may be found in relation to FIG. 3. Thus, a variety of different techniques (e.g., gestures) may be used to initiate transfer of the content 124 to the other mobile communications device 118, further discussion of which may be found in relation to the following figure.

FIG. 2 depicts a system 200 in an example implementation showing a gesture used to initiate a transfer of content 124 from a mobile communications device 102 to the other mobile communications device 118. The mobile communications device 102 as illustrated includes a display device 110 that has four edges that include top and bottom edges 202, 204 and left and right edges 206, 208.

The mobile communications device 102 is also illustrated as receiving a gesture 210 input by a user's finger 212. The gesture 210 may then be recognized as such by the content transfer module 120 using touchscreen functionality. For example, the gesture 210 may be input via a flick or drag of the user's finger 212 across the display device 110 and thus the content transfer module 120 may recognize this gesture 210 and react accordingly. Additionally, the gesture 210 may indicate a relative direction, which in this example is oriented generally towards the top edge 202 of the display device 110.

In response to the gesture, the content transfer module 120 may determine whether another mobile communications device is positioned along the top edge 202 and/or in the indicated direction of the gesture 210. In the illustrated example, the other mobile communications device 118 is positioned both along the top edge 202 of the mobile communications device 102 and in the indicated direction of the gesture 210. Accordingly, content 124 that is displayed on the display device 110 when the gesture 210 is received is then transferred to the other mobile communications device 118.

In the illustrated example, the transfer of the content 124 indicates the direction of the transfer by following the user's finger 212 on the display device 110. The content 124 may also indicate a direction from which it was "received" on the other mobile communications device 118, such as by progressively showing the content 124 as being received from the general direction of the mobile communications device 102 using an animation. Thus, the display of content 124 on the other mobile communications device 118 may indicate a relative location of the mobile communications device 102 that transferred the content 124. A variety of other implementations are also contemplated, such as to display the content 124 on the other mobile communications device 118 when the communication is completed (e.g., the content 124 has completed transfer), and so on.

As previously described, the content 124 may be transferred in a variety of ways. For example, the mobile communications devices 102, 118 may be connected over a local wireless network such that the content 124 is not transferred through an intermediary. In another example, an intermediary (e.g., a web service) is used to transfer the content 124, such as to transfer the content 124 via the internet. In a further example, an intermediary is used to locate other mobile communications devices (e.g., mobile communications device 118) for the transfer (which may or may not be involved in transfer of the actual content 124), further discussion of which may be found in relation to the following figure.

Figure 3:
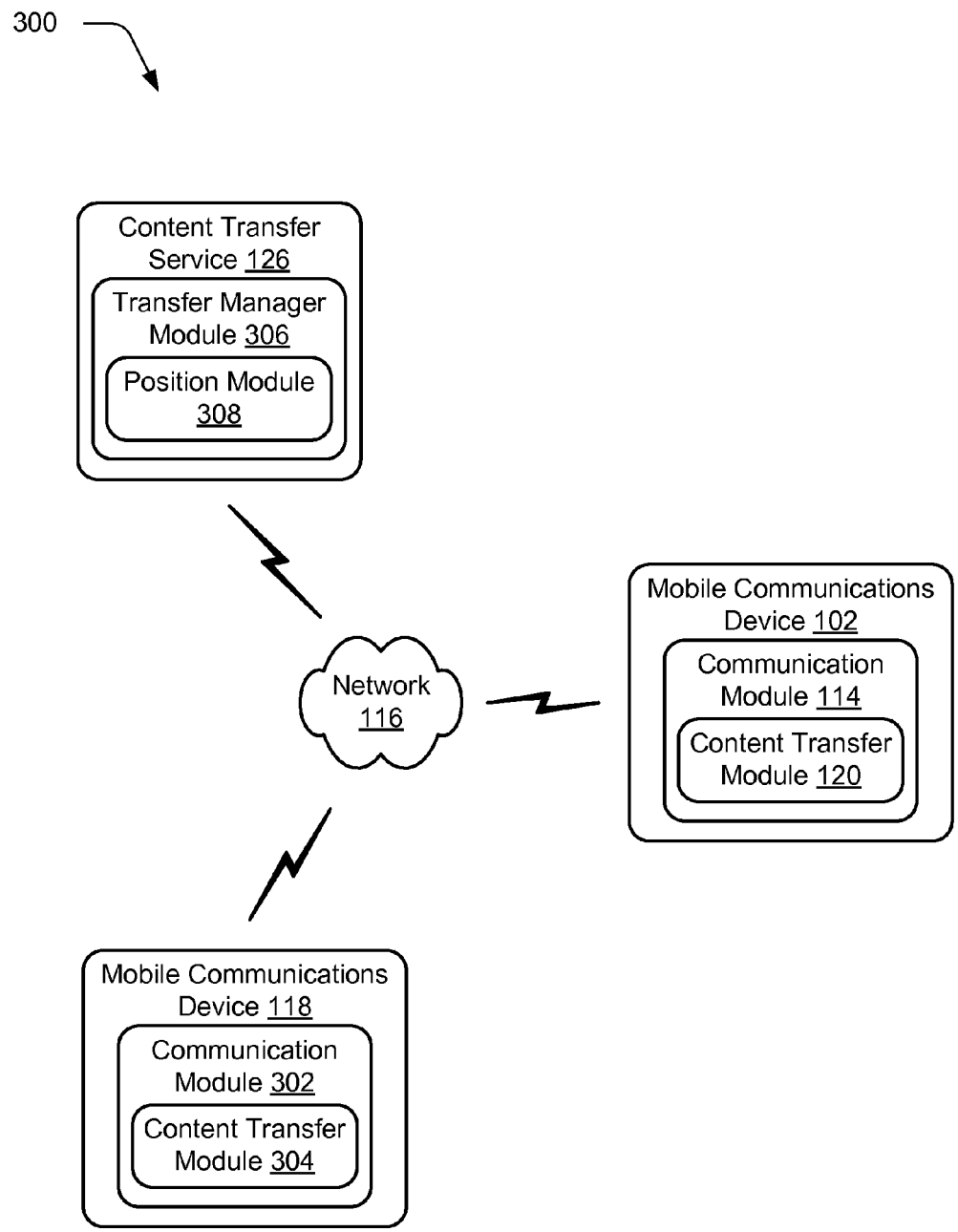
FIG. 3 depicts a system in an example implementation in which a content transfer service of FIG. 1 is used to aid location of the other mobile communications device.

FIG. 3 depicts a system 300 in an example implementation in which the content transfer service 126 of FIG. 1 is used to aid location of the other mobile communications device 118. As previously described, the mobile communications device 102 includes a communication module 114 and a content transfer module 120. In this example, the other mobile communications device 118 also includes a communication module 302 and content transfer module 304 having similar functionality, respectively. Thus, the mobile communications devices 102, 118 are configured to transfer content to and from each other either directly (e.g., over a local wireless connection), indirectly through the content transfer service 126, and/or indirectly through another web service.

The system 300 also includes a content transfer service 126 having a transfer manager module 306. The transfer manager module 306 is representative of functionality to aid content transfer between the mobile communications devices 102, 118. For example, the transfer manager module 306 is illustrated as having a position module 308 that is representative of functionality to track position of the mobile communications devices 102, 118. The position may be tracked in a variety of ways, such as through global positioning data that is obtained from the mobile communications devices 102, 118, indications of locations based on transmitters used to communicate with the devices (e.g., through triangulation), and so on. Thus, the location of the mobile communications device 102, 118 may be determined through communication with the mobile communications device 102, 118 themselves and/or other devices, e.g., cell towers for triangulation.

The position information (and other information) stored by the content transfer service 126 may be used to aid the content transfer process. For instance, the content transfer service 126 may record authentication information of the mobile communications devices, 102, 118 as well as connection information (e.g., a phone number and type of device). The transfer manager module 306 of the content transfer service may then use this information to recognize the devices as an authorized device, and thus a "friend device".

This information may then be published by the content transfer service 126 to the mobile communications devices 102, 118 at set time intervals. The mobile communications devices 102, 118 may then automatically detect its "friend devices," such as at predetermined time intervals (e.g., ten seconds) to locate devices within a predetermined range. For example, the range may be set for likelihood of content transfer (e.g., two meters) to limit the number of conflicts between other mobile communications devices, suitability for content transfer (e.g., effective range of a local wireless network), and so on.

For each device that meets these criteria, the mobile communications devices 102, 118 may automatically connect with the found device and record a relative position. The recorded relative position may have the following data structure:

```
// Relative geo position of a "friend device"
Strucut RelativePosition
{
Public int PhoneNumber; // The number of the phone which is globally unique.
Public RelativeSide relativeSide; // Indicate where the "Friend Phone" is currently located
Public x,y,z; // relative location in 3D world where the "Friend Phone" is currently located
}
Enum RelativeSide
{
Left,
Right,
Top,
Bottom
};
```

Thus, each of the mobile communications devices 102, 118 may record a relative position of other devices that are within range. In an implementation, the devices inform each other when there is a change in position. For example, the mobile communications device 102 may inform the other mobile communications device 118 of a change in coordinates so that the device may update its relative geographic position. This data may also be set to "time out" if updates and/or confirmations of location are not received at predetermined intervals. Therefore, in this example the devices are "aware" of the position of each other before a gesture is received to transfer the content, thereby promoting efficiency in the transfer of the content. A variety of other implementation are also contemplated, such as to locate the devices in response to the gesture. Further discussion of gestures, calculation of relative position, and content transfer may be found in relation to the following procedures.

Example Procedures

The following discussion describes content transfer techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 and systems 200-300 of FIGS. 1-3, respectively.

Figure 4:
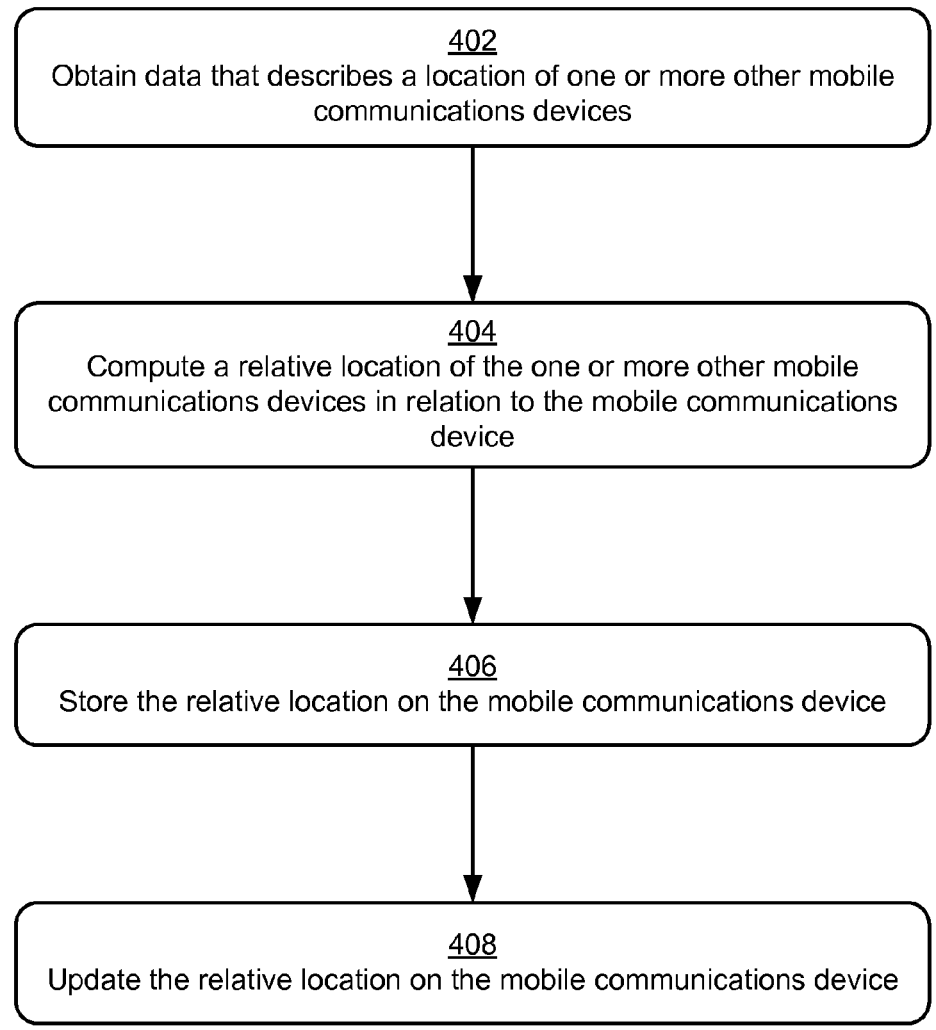
FIG. 4 is a flow diagram depicting a procedure in an example implementation in which a relative position of another mobile communications device is calculated and stored for use in content transfer.

FIG. 4 is a flow diagram depicting a procedure in an example implementation in which a relative position of another mobile communications device is calculated and stored for use in content transfer. Data is obtained that describes a location of one or more other mobile communications devices (block 402). For example, the mobile communication device 102 may receive a communication from the other mobile communications device 118 that describes a location of the other device, e.g., coordinates. In another example, this communication may be received from the content transfer service 126, which may have originally received the coordinates from the other mobile communications device 118 and/or determined the coordinates without contacting the device directly (e.g., via cell tower triangulation and so on). In a further example, the data may be obtained from the mobile communications device 102 itself, e.g., using a directional antenna to determine a direction from which a wireless signal was received from the mobile communications device 118. A variety of other examples are also contemplated, such as through location that is assisted by another third-party source, radio frequency identification, and so on.

A relative location of the one or more other mobile communications devices is computed in relation to the mobile communications device (block 404). For example, the content transfer module 120 may obtain the coordinates of the mobile communications device 118 and compare them with the coordinates of the mobile communications device 102 to compute a relative location.

The relative location may be described in a variety of ways. For example, the relative location may be described directionally, such as in a radial manner (e.g., as degrees that follow a basic layout of a compass), generally (e.g., aligned with a top edge, bottom edge, etc.), and so on. In another example, the relative location may be described using relative distances, e.g., close, middle, far. A variety of other examples are also contemplated, such as the storing of actual coordinates which are then used to calculate the relative location at a later time, e.g., after receipt of a gesture.

The relative location is stored on the mobile communications device (block 406). Thus, in this manner the mobile communications device 102 is "ready" for receipt of a gesture to indicate where to transfer the content and can do so in a efficient manner. Additionally, the relative location may be updated on the mobile communications device (block 408). For example, if the mobile communications device 118 is moved, it may communicate an update to the content transfer module 120 of the mobile communications device 102. In another example, the content transfer service 126 and/or the mobile communications device 102 may determine when the other mobile communications device 118 is moved (e.g., through periodic polling) and generate an update. This stored data may then be used to support a content transfer process, further discussion of which may be found in relation to the following figure.

Figure 5:
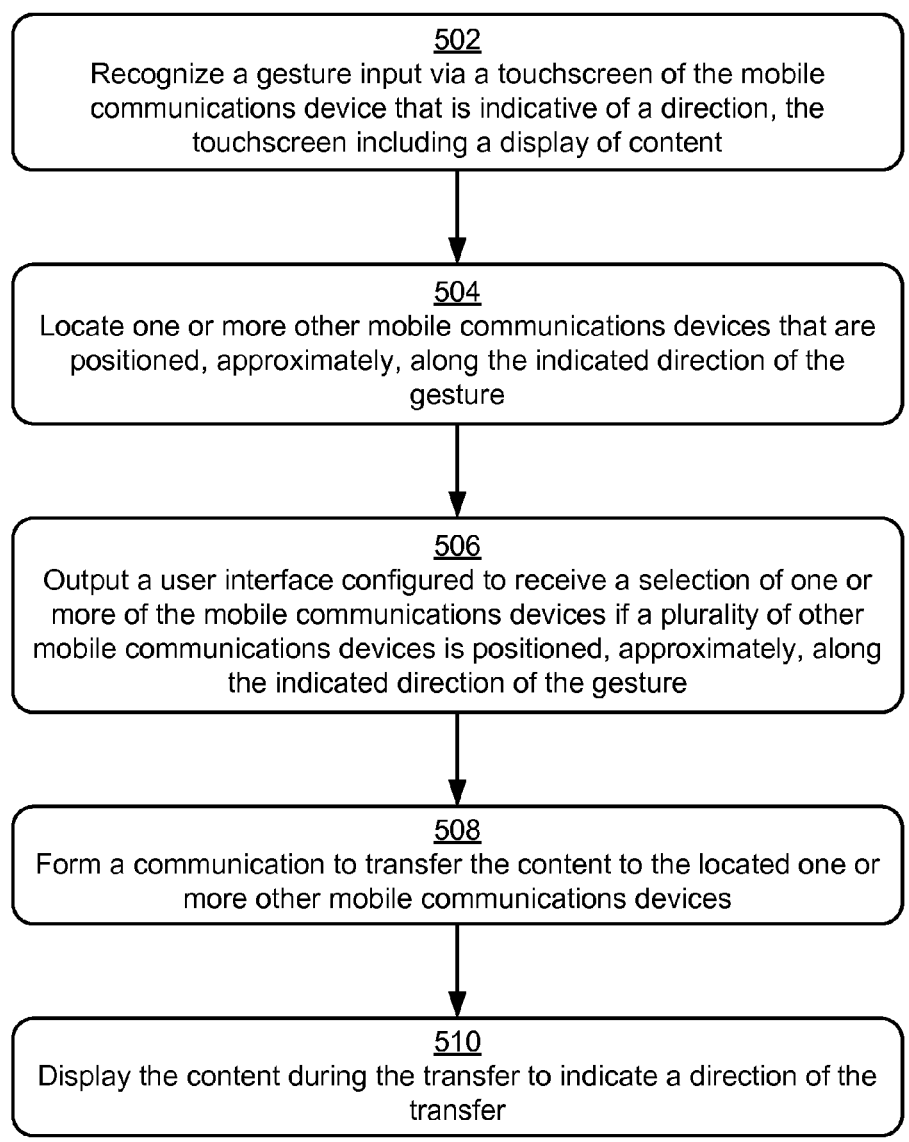
FIG. 5 is a flow diagram depicting a procedure in an example implementation in which a gesture is used to initiate a transfer of content.

FIG. 5 depicts a procedure 500 in an example implementation in which a gesture is used to initiate a transfer of content to a mobile communications device that is aligned with an approximate direction indicated by the gesture. A gesture input via a touchscreen of the mobile communications device is recognized as being indicative of a direction, the touchscreen including a display of content (block 502). As shown in FIG. 2, for instance, a gesture 210 is received that indicates a top edge 202 of the display device 110. The content transfer module 120 may recognize the gesture 210 and the indicated direction through touchscreen functionality of the display device 110.

One or more other mobile communications devices are located that are positioned, approximately, along the indicated direction of the gesture (block 504). The content transfer module 120, for instance, may query data stored by the procedure 400 of FIG. 4 to determine if one or more mobile communications devices are located along that edge.

A user interface is output that is configured to receive a selection of one or more of the mobile communications devices if a plurality of other mobile communications devices is positioned, approximately, along the indicated direction of the gesture (block 506). For example, a plurality of devices may be located in a direction. Accordingly, in this implementation a user interface is output that is configured to enable a user to select one or more of the devices to receive the content. A variety of other implementations are also contemplated, such as automatic transfer to each friend device in the approximate direction.

A communication is then formed to transfer the content to the located one or more other mobile communications devices (block 508). The communication may be formed in a variety of ways, such as for transfer over a local wireless network, a wide area network, the internet, and so on.

The content is displayed during the transfer to indicate a direction of the transfer (block 510). Referring again to FIG. 2, the content 124 may be displayed by the mobile communications device 102 to be aligned with the indicated direction of the gesture 210 and thus the approximate direction of the transfer. Additionally, the other mobile communications device 118 may also indicate a direction from which the content 124 was received. A variety of other examples are also contemplated.

Example Device

Figure 6:
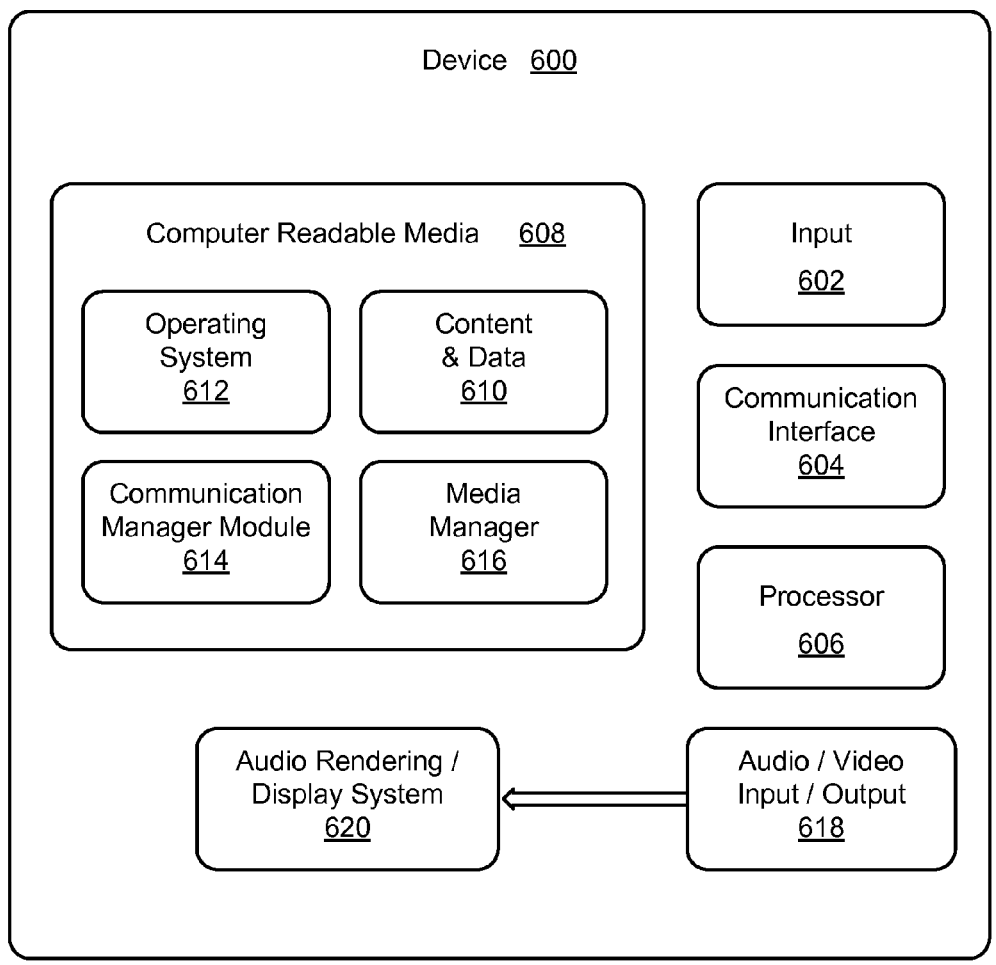
FIG. 6 illustrates various components of an example device that can be implemented in various embodiments as any type of a mobile device to implement embodiments of devices, features, and systems for mobile communications.

FIG. 6 illustrates various components of an example device 600 that can be implemented in various embodiments as any type of a mobile device to implement embodiments of devices, features, and systems for mobile communications. For example, device 600 can be implemented as any of the mobile communications devices 102 described with reference to respective FIGS. 1-3. Device 600 can also be implemented to access a network-based service, such as a social network service as previously described.

Device 600 includes input 602 that may include Internet Protocol (IP) inputs as well as other input devices, such as the keyboard 112 of FIG. 1. Device 600 further includes communication interface 604 that can be implemented as any one or more of a wireless interface, any type of network interface, and as any other type of communication interface. A network interface provides a connection between device 600 and a communication network by which other electronic and computing devices can communicate data with device 600. A wireless interface enables device 600 to operate as a mobile device for wireless communications.

Device 600 also includes one or more processors 606 (e.g., any of microprocessors, controllers, and the like) which process various computer-executable instructions to control the operation of device 600 and to communicate with other electronic devices. Device 600 can be implemented with computer-readable media 608, such as one or more memory components, examples of which include random access memory (RAM) and non-volatile memory (e.g., any one or more of a read-only memory (ROM), flash memory, EPROM, EEPROM, etc.).

Computer-readable media 608 provides data storage to store content and data 610, as well as device applications and any other types of information and/or data related to operational aspects of device 600. For example, an operating system 612 can be maintained as a computer application with the computer-readable media 608 and executed on processor 606. Device applications can also include a communication manager module 614 (which may be used to provide telephonic functionality) and a media manager 616.

Device 600 also includes an audio and/or video output 618 that provides audio and/or video data to an audio rendering and/or display system 620. The audio rendering and/or display system 620 can be implemented as integrated component(s) of the example device 600, and can include any components that process, display, and/or otherwise render audio, video, and image data. Device 600 can also be implemented to provide a user tactile feedback, such as vibrate and haptics.

Generally, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer readable memory devices. The features of the techniques described above are platform-independent, meaning that the techniques may be implemented on a variety of commercial computing platforms having a variety of processors.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a mobile communication device comprising a screen, the method comprising:
   receiving a communication of content at the mobile communication device from another mobile communication device within a predetermined range;
   determining, concurrently with the receiving, a geographical direction from the other mobile communication device to the mobile communication device; and
   displaying, during the receiving of the content, an animation indicating the determined geographical direction from which the communication of the content was received by the mobile communication device, the animation extending from an edge of the screen that is in the geographical direction relative to the other mobile communication device, the animation indicating the determined geographical direction progressively showing the content as being received from the geographical direction of the other mobile communication device.

2. The method of claim 1, wherein the determining the geographical direction further comprises receiving location information about a location of the other mobile communication device.

3. The method of claim 2, wherein the location information is received from the other mobile communication device.

4. The method of claim 2, wherein the location information is received from a source other than the other mobile communication device.

5. The method of claim 4, wherein the receiving the communication of the content from the other mobile communication device comprises receiving the communication of the content through a content transfer service.

6. The method of claim 5, wherein the content transfer service determines the location of the other mobile communication device and communicates the location information to the mobile communication device.

7. The method of claim 1, further comprising displaying the content on the mobile communication device responsive to completion of the receiving of the communication of the content.

8. The method of claim 1, wherein the content is communicated by the other mobile communication device responsive to recognition of a gesture that is indicative of a direction toward the mobile communication device.

9. A mobile communication device comprising:
   one or more processors;
   a display device, coupled to the one or more processors, comprising a screen;
   memory, coupled to the one or more processors, comprising instructions executable by the one or more processors to perform operations comprising:
   receiving a transfer of content at the mobile communication device from another mobile communication device within a predetermined range;
   determining, as part of the reception, a geographical direction of the other mobile communication device in relation to the mobile communication device; and
   displaying, during the transfer of the content, an animation indicating the determined geographical direction from which communication of the content was received by the mobile communication device, the animation extending from an edge of the screen corresponding to the determined geographical direction from which the communication of the content was received by the mobile communication device, and the animation indicating the determined geographical direction by progressively showing the content as being received from the geographical direction of the other mobile communication device.

10. The mobile communication device of claim 9, the instructions being further executable to perform operations including displaying progress of the transfer of the content with the animation.

11. The mobile communication device of claim 9, wherein the determination of the geographical direction further comprises receiving location information.

12. The mobile communication device of claim 11, wherein the location information is received from the other mobile communication device.

13. The mobile communication device of claim 11, wherein the location information is received from a source other than the other mobile communication device.

14. The mobile communication device of claim 13, wherein the transfer of the content comprises transferring the content through a content transfer service.

15. The mobile communication device of claim 14, wherein the content transfer service determines a location of the other mobile communication device and communicates the location information to the mobile communication device.

16. The mobile communication device of claim 9, the instructions being further executable to:
   display the transferred content on the mobile communication device, when the transfer of the content is complete.

17. The mobile communication device of claim 9, wherein the content is communicated by the other mobile communication device responsive to recognition of a gesture that is indicative of a direction toward the mobile communication device.

18. A system comprising:
   a first mobile communication device configured to:
   recognize a gesture on a touchscreen display to initiate a transfer of content;
   determine a direction associated with the gesture, the direction of the gesture indicative of transferring the content to a second mobile communication device located in the determined direction and within a predetermined range;
   form a communication to transfer the content to the second mobile communication device;
   transfer, over the formed communication, the content to the second mobile communication device;
   the second mobile communication device configured to:
   responsive to the transfer from the first mobile communication device:
   receive the transfer of the content;
   determine, concurrently with the reception, a geographical direction from the first mobile communication device, the determination based on information received about a location of first mobile communication device;
   display on a touchscreen of the second mobile communication device, during the reception of the content, an animation extending from an edge of the touchscreen corresponding to the determined geographical direction from which the transfer of the content was received, the animation showing the content as being progressively received from the geographical direction of the first mobile communication device, whereby a first portion of the content is visible on the touchscreen of the first mobile device while a second, different portion of the content is simultaneously visible on the touchscreen of the second mobile device; and
   display the content on the second mobile communication device, when the transfer is complete.

19. The system of claim 18 further comprising a content transfer service configured to:
   determine the location of the first mobile communication device;
   responsive to the transfer from the first mobile communication device, receive the content;
   transfer the content to the second mobile communication device; and
   communicate information comprising the location of the first mobile communication device to the second mobile communication device.

* * * * *